United States Patent [19]

Kühlthau

[11] 4,292,238

[45] Sep. 29, 1981

[54] ALKYLATION OF BENZTHIAZOLE-AZO-PHENYLAMINE DYESTUFFS

[75] Inventor: Hans-Peter Kühlthau, Leverkusen, Fed. Rep. of Germany

[73] Assignee: Bayer Aktiengesellschaft, Leverkusen, Fed. Rep. of Germany

[21] Appl. No.: 798,476

[22] Filed: May 19, 1977

[30] Foreign Application Priority Data

May 22, 1976 [DE] Fed. Rep. of Germany ....... 2623162

[51] Int. Cl.³ ..................... C09B 43/11; C09B 44/20; D06P 1/41; D06P 3/76
[52] U.S. Cl. .................................. 260/158; 260/155; 260/156; 260/208
[58] Field of Search ................. 260/158, 208, 156, 155

[56] References Cited

U.S. PATENT DOCUMENTS 3,585,182 6/1971 Straley et al. ..................... 260/157
3,732,201 5/1973 Ramanathan ..................... 260/153

FOREIGN PATENT DOCUMENTS 1050940 2/1959 Fed. Rep. of Germany ...... 260/158
1018458 1/1966 United Kingdom ............... 260/158

Primary Examiner—Floyd D. Higel

Attorney, Agent, or Firm—Sprung, Felfe, Horn, Lynch & Kramer

[57] ABSTRACT

Process for the preparation of benzthiazole dyestuffs by alkylation of compounds of the formula

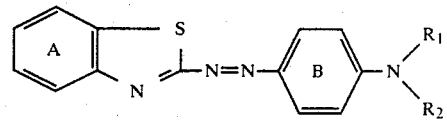

wherein $R_1$ and $R_2$ denote hydrogen, alkyl, alkenyl, cycloalkyl, aryl or aralkyl, or, conjointly with the N-atom, form a ring, or $R_1$ can be linked to the o-position of the ring B and the rings A and B and the radicals $R_1$ and $R_2$ can contain non-ionic substituents and carbocyclic or heterocyclic rings can be fused to the rings A and B, with esters of the formula $R_3$—$SO_3R$ wherein
R denotes an alkyl radical and
$R_3$ denotes an aryl radical or R—O, in organic solvents and consequently alkylation by the addition of water.

5 Claims, No Drawings

ALKYLATION OF BENZTHIAZOLE-AZO-PHENYLAMINE DYESTUFFS

When benzthiazole compounds of the formula

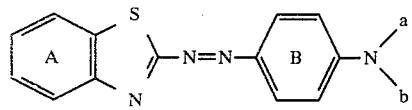

wherein a and b represent hydrogen or aliphatic, araliphatic, aromatic or alicyclic radicals are quaternised with esters of sulphuric acid or arylsulphonic acids in inert organic solvents, dyestuffs are obtained which are suitable for dyeing acid-modified synthetic fibres in blue shades but which dye wool and cotton in a reddish shade. This disadvantage, which is very troublesome when dyeing fibre mixtures and is mentioned, for example, in German Offenlegungsschrift (German Published Specification) No. 1,943,799, is due to the fact that the dyestuffs prepared in this way contain a small amount of the red precursor (I) which has been trapped in the alkylated dyestuff or protonated by small amounts of acid present in the alkylation mixture and therefore was no longer accessible for alkylation even after a long reaction time.

A process with which this possibility of protonation is excluded by carrying out the alkylation with a dialkyl sulphate in an aqueous solvent-free medium in the presence of a basic substance is described in German Offenlegungsschrift (German Published Specification) No. 1,943,799. However, it is pointed out that it is necessary either to eliminate the basic agent immediately after the reaction has ended by lowering the pH value or to isolate the dyestuff immediately (page 8). When the basic agent acts for too long, the nucleophilic substitution of the amino group by the OH group, which takes place particularly readily in the case of thiazole compounds (compare, for example Voltz, Chimia 15, (1961), page 168–176), can thus not be excluded with this process. The process therefore has disadvantages on an industrial scale, that is to say with a relatively long residence time.

It has been found, surprisingly, that the content of protonated starting material which results when the alkylation is carried out in an inert organic solvent can rapidly be supplied for alkylation, without the addition of basic agents, by adding water to the alkylation mixture after the main reaction has taken place. On the addition of water, the small amounts of acid salts of the precursors (I), present as impurities, hydrolyse immediately, even in the acid range, and within a short time react with any esters of sulphuric acid or arylsulphonic acids which may be added at the same time. The dyestuffs alkylated in this way display no red coloration of wool or cotton when mixed fibres made of wool or cotton and acid-modified fibres are dyed. Elimination of the amino group by basic agents is not to be feared.

The invention thus consists of a process for the preparation of dyestuffs of the formula

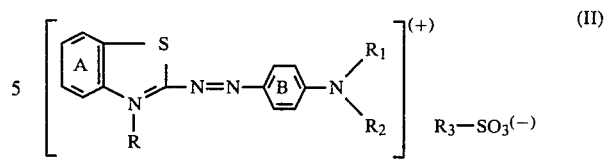

wherein
R denotes an alkyl radical and
$R_1$ and $R_2$ independently of one another denote hydrogen, alkyl, alkenyl, cycloalkyl, aryl or aralkyl, or, conjointly with the N atom, form a ring, or $R_1$ can be linked to the o-position of the ring B, and
$R_3$ denotes an aryl radical or R—O,
wherein the rings A and B and the radicals $R_1$ and $R_2$ can contain non-ionic substituents and carbocyclic or heterocyclic rings can be fused to the rings A and B. The process consists in alkylating benzthiazole dyestuffs of the formula

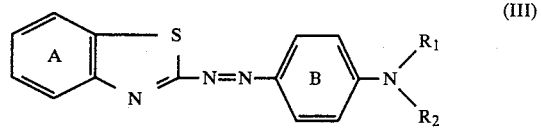

wherein the symbols have the abovementioned meaning, with esters of the formula $$R_3-SO_3R \qquad (IV)$$

wherein R and $R_3$ have the abovementioned meaning, in organic solvents and bringing the reaction to completion with the addition of water.

With this process, the reaction is first carried out in a known manner, by adding the ester (IV), preferably in a slight excess, at elevated temperature, to a solution of the dyestuff (III) to be quaternised, in a solvent which is preferably immiscible with water or only partly miscible with water. For example, the reaction can be carried out in accordance with the process described in German Auslegeschrift (German Published Specification) No. 1,050,940, Example 1.

However, it is also possible to mix a solution or suspension of the azo dyestuff to be quaternised with the ester (IV) at room temperature and then slowly to warm this mixture to the desired reaction temperature.

As soon as the alkylation, which can be followed easily by the thin layer chromatogram, proceeds no further, that is to say the content of azo dyestuff (III) does not decrease or hardly still decreases, about 5–100, and preferably 5–50, % by volume of the reaction volume of water, and, optionally, further ester (IV), are added. The total amount of ester is up to 4 mols per mol of dyestuff (III). The remainder of the base then disappears after stirring briefly. The solvent can then be separated off, for example by steam distillation.

The dyestuff is isolated by salting out and filtering. When salting out, the anion of the dyestuff (II) is wholly or partly replaced, in a known manner, by the anion of the salt which is added. In this case, the dyestuff is preferably isolated as the chloride. However, the anion of the dyestuff (II) can also be replaced, after the preparation of the dyestuff and preferably in the reaction mixture, by other anions customary for cationic dyestuffs. Apart from the lack of the basic agent, the new process has the advantage, over the reaction in a solvent-free aqueous medium, that substantially less ester (IV) is consumed. In general, 1.8 to 2.5 mols per mol of dyestuff suffice.

Suitable organic solvents are, for example, halogenobenzenes, benzene hydrocarbons, nitrobenzene or halogenoalkanes, such as carbon tetrachloride, ethylene tetrachloride or chloroform. Solvents which are miscible with water or partly miscible with water, such as acetonitrile or dialkyl ketones, can also be employed.

The reaction temperatures in the organic solvent are between 30° C. and 130° C.

After adding the water, the reaction is brought to completion at 30° C. to 80° C.

A further 0.05 to 0.5 mol of the ester (IV), relative to the amount of dyestuff, are, for example, added at the same time as the water.

In the sense of the present invention, non-ionic substituents are understood as the substituents which are customary in dyestuff chemistry and which do not dissociate under the particular reaction conditions, such as halogen, for example fluorine, chlorine or bromine; nitro, cyano, formyl, ureido, aminocarbonyl and aminosulphonyl; the following radicals which contain alkyl groups and in which the alkyl groups preferably possess 1–4 C atoms: alkoxy, alkylthio, alkoxycarbonyl, alkylcarbonyl, alkylcarbonyloxy, alkoxycarbonyloxy, alkylcarbonylamino, alkylaminocarbonyloxy, alkylsulphonylamino, alkylureido, alkoxycarbonylamino, alkylaminocarbonyl, dialkylaminocarbonyl, N-alkyl-N-aryl-aminocarbonyl, in which the aryl group preferably represents a phenyl group, and alkylaminosulphonyl, dialkylaminosulphonyl, alkylsulphonyl, alkoxysulphonyl or alkylsulphonyl-alkylamino; and also aryl and radicals which contain aryl groups, in which the aryl radical preferably denotes phenyl or naphthyl: aryloxy, aryloxyalkoxy, arylthio, arylcarbonyl, aryloxycarbonyloxy, arylcarbonyloxy, arylcarbonylamino, arylaminocarbonyloxy, arylsulphonylamino, arylsulphonylalkylamino, arylureido, aryloxycarbonylamino, arylsulphonyl, aryloxycarbonyl or aryloxysulphonyl; radicals which contain aralkyl groups and in which the aralkyl groups preferably denote benzyl or phenylethyl: aralkoxy, aralkylthio, aralkylcarbonyl, aralkylsulphonyl or aralkyloxycarbonyl; and also cycloalkyl or radicals which contain cycloalkyl groups, in which the cycloalkyl group preferably represents a cyclopentyl or cyclohexyl radical, such as cycloalkoxy. In addition, alkyl with, preferably, 1–12 C atoms or aralkyl having the preferred definition indicated above are also possible as non-ionic substituents which are bonded to a cyclic radical.

Examples which may be mentioned of the radicals mentioned in the definitions of $R_1$ and $R_2$ are: as alkyl radicals, above all $C_1$–$C_6$-alkyl radicals, such as the methyl, ethyl, n- and i-propyl and n-, sec- and t-butyl radical and the n- and i-amyl radical and the n-hexyl radical; and also $C_1$–$C_6$-alkyl radicals which are substituted by a carboxyl group or by non-ionic substituents, such as halogen atoms or hydroxyl, $C_1$–$C_4$-alkoxy, cyano, $C_1$–$C_4$-alkoxycarbonyl, $C_1$–$C_4$-alkylcarbonyloxy, carboxamide, $C_1$–$C_6$-alkylsulphonylamino, N-($C_1$–$C_6$-alkyl)-N-($C_1$–$C_6$-alkylsulphonyl)-amino or N-($C_1$–$C_6$-alkyl)-N-(phenylsulphonyl)-amino groups, such as the trifluoromethyl, chloroethyl, bromoethyl, hydroxyethyl, methoxyethyl, cyanoethyl, acetoxyethyl, aminocarbonylethyl, carboxyethyl, γ-cyanopropyl, β-hydroxy-n-propyl, β-hydroxy-n-butyl, β-hydroxyibutyl, β-hydroxy-γ-allyloxy-n-propyl, γ-methoxy-carbonyl-n-butyl, phenylsulphonylaminoethyl, $C_1$–$C_6$-alkylsulphonylaminoethyl, N-(phenylsulphonyl)-N-methyl-aminoethyl or N-methylsulphonyl-N-methyl radical; as alkenyl radicals, above all $C_2$–$C_6$-alkenyl radicals, such as the vinyl, allyl or methallyl radical, and their derivatives substituted by non-ionic radicals, such as halogen, such as the 2-chloroalkyl radical; as cycloalkyl radicals, above all the cyclopentyl and cyclohexyl radical and their derivatives substituted by non-ionic substituents, such as halogen atoms or $C_1$–$C_6$-alkyl groups, such as the 4-chlorocyclohexyl and the dimethyl-cyclohexyl radical; as aralkyl radicals, above all, the benzyl, 2-phenylethyl, β-phenyl-β-hydroxyethyl or 2-phenylpropyl-(2) radical, and their derivatives substituted in the phenyl nucleus by non-ionic groups or atoms, such as halogen or $C_1$–$C_6$-alkyl, such as the 4-chlorobenzyl or 3-methylbenzyl radical; and as aryl radicals, preferably the phenyl or naphthyl radical and their derivatives substituted by non-ionic radicals, such as halogen atoms or $C_1$–$C_4$-alkyl or $C_1$–$C_4$-alkoxy groups.

A benzene or tetrahydrobenzene ring can, for example, be fused to the ring B and a benzene or tetrahydrobenzene ring can, for example, be fused to the ring A in the 4,5-, 5,6- or 6,7-position.

These rings can carry 1–3 substituents.

Preferred substituents of ring A are, for example, $C_1$–$C_6$-alkyl, $C_1$–$C_4$-alkoxy, halogen, trifluoromethyl, cyano, $C_1$–$C_4$-alkylsulphonyl or cyclopentyl, cyclohexyl, benzyl or β-phenylethyl which are optionally substituted by $C_1$–$C_6$-alkyl, or phenyl, naphthyl or benzyloxy which are optionally substituted by $C_1$–$C_6$alkyl or halogen; or $C_1$–$C_4$-alkylcarbonyl- or -sulphonylamino, phenylcarbonyl- or -sulphonylamino or phenylcarbonyl or -sulphonylamino.

Preferred substituents of the ring B are, for example, halogen, $C_1$–$C_6$-alkyl, trifluoromethyl, $C_1$–$C_4$-alkoxy, phenyloxy, benzyloxy, benzyl, cyano, $C_1$–$C_3$-alkylcarbonylamino, benzoylamino, $C_1$–$C_3$-sulphonylamino, phenylsulphonylamino, $C_1$–$C_3$-alkylcarbonyloxy, benzoyloxy or $C_1$–$C_4$-alkylsulphonyl.

Halogen is understood as, preferably, fluorine, chlorine or bromine.

Conjointly with the nitrogen atom, the substituents $R_1$ and $R_2$ can form, for example, a 5-membered or 6-membered ring, such as a pyrrolidine, piperidine or morpholine ring.

If the substituent $R_1$ is linked to the o-position of B, it preferably forms a 5-membered or 6-membered ring and in particular it forms, conjointly with B, a dihydroindole, tetrahydroquinoline or hexahydrocarbazole ring.

The said rings, which are formed by $R_1$, can be substituted, for example by 1–4 $C_1$–$C_4$-alkyl groups.

The process is particularly important for the alkylation of dyestuffs of the formula

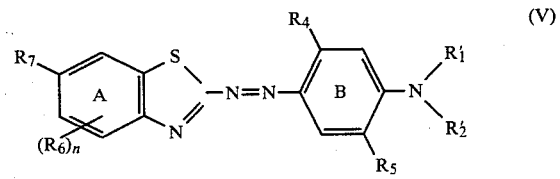

(V)

wherein $R_1'$ and $R_2'$ represent $C_1$–$C_6$-alkyl which is optionally substituted by halogen, hydroxyl, $C_1$–$C_4$-alkoxy, cyano, C₁–C₃-alkylcarbonyloxy, hydroxycarbonyl, C₁–C₄-alkoxycarbonyl, C₁–C₄-alkoxycarbonyloxy, aminocarbonyl, C₁–C₄-alkylsulphonylamino or C₁–C₄-alkylsulphonyl-C₁–C₄-alkylamino; C₂–C₇-alkenyl; or phenyl, cyclopentyl, cyclohexyl, benzyl or β-phenylethyl which are optionally substituted by C₁–C₆-alkyl, or, conjointly with the N atom, form a morpholine, piperidine or pyrrolidine ring which is optionally substituted by 1–4 C₁–C₄-alkyl groups, or R₁ is linked to the ring B with the formation of an indoline, tetrahydroquinoline or hexahydrocarbazole ring which is optionally substituted by 1–4 C₁–C₄-alkyl groups, and R₄ represents hydrogen, halogen, C₁–C₆-alkyl which is optionally substituted by halogen, or C₁–C₄-alkoxy, or benzyloxy or β-phenylethoxy which is optionally substituted in the phenyl ring by C₁–C₆-alkyl, or cyano, or phenoxy or naphthyloxy which is optionally substituted by C₁–C₆-alkyl or halogen, or C₁–C₄-alkylcarbonyl- or -sulphonyl-amino, phenylcarbonyl- or -sulphonyl-amino, C₁–C₄-alkylcarbonyloxy or phenylcarbonyloxy, or conjointly with B represents a naphthalene or tetraline ring, R₅ represents hydrogen, C₁–C₆-alkyl, C₁–C₄-alkoxy, or benzyloxy or β-phenylethoxy which is optionally substituted in the phenyl ring by C₁–C₆-alkyl, phenyloxy or naphthyloxy which is optionally substituted by C₁–C₆-alkyl or halogen, or C₁–C₄-alkylcarbonyl- or -sulphonyl-amino, phenylcarbonyl- or -sulphonyl-amino, C₁–C₄-alkylcarbonyloxy or phenylcarbonyloxy, or conjointly with B represents a naphthalene or tetraline ring, R₆ represents C₁–C₆-alkyl, C₁–C₄-alkoxy, phenoxy, benzyloxy, benzyl, trifluoromethyl, halogen, C₁–C₄-alkylcarbonyl- or -sulphonyl-amino, phenylcarbonyl- or -sulphonyl-amino or a benzene or tetrahydrobenzene ring which is fused in the 6,7-position of A, n represents the numbers 0, 1, 2 or 3 and R₇ represents hydrogen, C₁–C₆-alkyl; C₁–C₄-alkoxy; cyclopentyl, cyclohexyl, benzyl or β-phenylethyl which are optionally substituted by C₁–C₆-alkyl; phenoxy, naphthyloxy or benzyloxy which are optionally substituted by C₁–C₆-alkyl or halogen; halogen, C₁–C₄-alkylcarbonyl- or -sulphonyl-amino or phenylcarbonyl- or -sulphonyl-amino; or represents a benzene or tetrahydrobenzene ring fused in the 4,5- or 5,6-position of A.

From the formula (V), dyestuffs of the formula

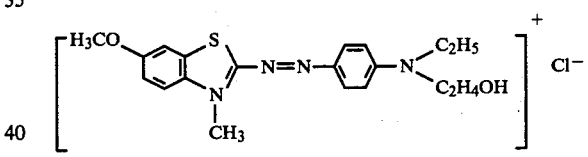

wherein

R₁″ represents C₁–C₄-alkyl which is optionally substituted by hydroxyl, or represents benzyl, R₁″ represents R₂″ and also represents phenyl, R₄′ represents hydrogen, methyl or methoxy, R₆′ represents methyl, ethyl, methoxy, ethoxy, fluorine, chlorine, bromine, trifluoromethyl, phenoxy or benzyloxy, n′ represents 0 or 1 and R₇′ represents C₁–C₄-alkoxy, are to be singled out.

Amongst these dyestuffs those in which n′ represents 0 and R₇′ represents methoxy or ethoxy are the most interesting.

Particularly suitable esters are, above all, those of the formula (IV) wherein R represents a C₁–C₄-alkyl radical, especially methyl, and R₃ represents a C₁–C₄-alkoxy radical or a phenyl, tolyl or chlorophenyl radical, especially methoxy.

EXAMPLE 1

33 g of the azo dyestuff prepared by coupling diazotised 2-amino-6-methoxybenzthiazole with N-ethyl-N-β-hydroxyethylaniline are stirred with 300 ml of chlorobenzene and 22 g of dimethyl sulphate and the mixture is slowly warmed to 80° C. The resulting suspension is then stirred for a further 1.5 hours at 80° C. and 100 ml of water and 5 g of dimethyl sulphate are then added, without further heating, and the mixture is stirred for about a further 30 minutes. During this time, the solution cools from 80° C. to 40° C. The chlorobenzene is then driven off with steam and the dyestuff is salted out from the distillation residue using sodium chloride and filtered off after cooling. It dyes polyacrylonitrile materials with good fastness properties.

EXAMPLE 2

33 g of the azo dyestuff prepared by coupling diazotised 2-amino-6-methoxybenzthiazole with N-ethyl-N-β-hydroxyethylaniline are stirred in 300 ml chlorobenzene. 22 g of dimethyl sulphate are added dropwise to this mixture in the course of 1 hour, at 80° C., whilst stirring. The suspension is then stirred for a further 1.5 hours at 80° C. and the subsequent procedure is as in Example 1. The resulting dyestuff dyes polyacrylic/wool mixtures without dyeing the wool in a reddish shade. It has the formula

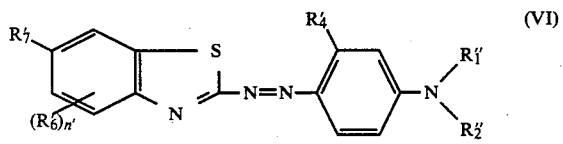

Each of the steps prescribed in Example 1 and 2, whether this be the time over which the dimethyl sulphate is metered in, the time which is used for heating up or the time during which the aqueous/organic two-phase suspension is subsequently stirred, can, without hesitation, be extended to several hours, as can be absolutely essential under industrial conditions, without the good quality of the dyestuff in respect of fastness properties, clarity or staining of wool suffering.

Results equally as good as those achieved in Examples 1 and 2 are obtained when dyestuffs which are prepared from dimethylaniline, N-ethyl-N-β-hydroxypropylaniline, diethylaniline or N-ethyl-N-benzylaniline instead of from N-ethyl-N-β-hydroxyethylaniline are quaternised.

I claim:

1. Process for the preparation of an alkylated dyestuff, wherein a benzthiazole dyestuff of the formula

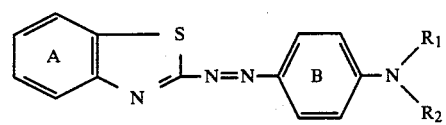

wherein $R_1$ and $R_2$ independently of one another denote hydrogen, alkyl, alkenyl, cycloalkyl, aryl or aralkyl, or, when joined together are pyrrolidinyl, piperidinyl, or morpholinyl;

$R_1$, in addition, when joined to the ortho-position of ring B, forms dihydroindolyl, tetrahydroquinolinyl, or hexahydrocarbazolyl;

rings A and B are unsubstituted or substituted with fluoro, chloro, bromo, nitro, cyano, formyl, ureido, aminocarbonyl, aminosulphonyl, $C_1$–$C_4$-alkoxy, $C_1$–$C_4$-alkylthio, $C_1$–$C_4$-alkoxycarbonyl, $C_1$–$C_4$-alkylcarbonyl, $C_1$–$C_4$-alkylcarbonyloxy, $C_1$–$C_4$-alkoxycarbonyloxy, $C_1$–$C_4$-alkylcarbonylamino, $C_1$–$C_4$-alkylaminocarbonyloxy, $C_1$–$C_4$-alkylsulphonylamino, $C_1$–$C_4$-alkylureido, $C_1$–$C_4$-alkoxycarbonylamino, $C_1$–$C_4$-alkylaminocarbonyl, $C_1$–$C_4$-dialkylaminocarbonyl, N-$C_1$–$C_4$-alkyl-N-phenylaminocarbonyl, $C_1$–$C_4$-alkylaminosulphonyl, $C_1$–$C_4$-dialkylaminosulphonyl, $C_1$–$C_4$-alkylsulphonyl, $C_1$–$C_4$-alkoxysulphonyl-$C_1$–$C_4$-alkylamino, $C_1$–$C_4$-alkylsulphonyl-$C_1$–$C_4$-alkylamino, phenoxy, naphthoxy, phenoxy-$C_1$–$C_4$-alkoxy, naphthoxy-$C_1$–$C_4$-alkoxy, phenylthio, naphthylthio, phenylcarbonyl, naphthylcarbonyl, phenoxycarbonyloxy, naphthoxy-carbonyloxy, phenylcarbonyloxy, naphthylcarbonyloxy, phenylcarbonylamino, naphthylcarbonylamino, phenylaminocarbonyloxy, naphthylaminocarbonyloxy, phenylsulphenylamino, naphthylsulphonylamino, phenylsulphonyl-$C_1$–$C_4$-alkylamino, naphthylsulphonyl-$C_1$–$C_4$-alkylamino, phenylureido, naphthylureido, phenoxycarbonylamino, naphthoxycarbonylamino, phenylsulphonyl, naphthylsulphonyl, phenoxycarbonyl, naphthoxycarbonyl, phenoxysulphonyl, naphthoxysulphonyl, benzoxy, phenylethyloxy, benzylthio, phenylethylthio, benzylcarbonyl, phenylethylcarbonyl, benzylsulphonyl, phenylethylsulphonyl, benzoxycarbonyl, phenylethyloxycarbonyl, cyclopentyl, cyclohexyl, cyclopentyl-$C_1$–$C_4$-alkoxy, cyclohexyl-$C_1$–$C_4$-alkoxy, a fused benzene ring, or a fused tetrahydrobenzene ring;

the process wherein said dyestuff is alkylated with an ester of the formula

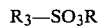

$R_3$—$SO_3R$ wherein
R is alkyl and
$R_3$ is aryl or alkoxy;
in an organic solvent immiscible with water, the alkylation being brought to completion at 30° C. to 80° C. after addition of 5–100% by volume of the reaction volume of water and 0.05–0.5 mol, relative to the amount of dyestuff, of the alkylester employed for alkylation.

2. Process of claim 1, wherein the starting material dyestuff has the formula

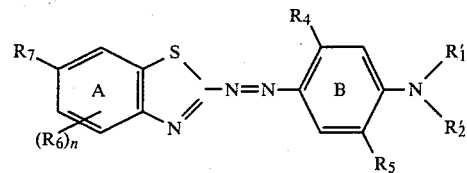

wherein
$R'_1$ and $R'_2$ are $C_1$–$C_6$-alkyl, $C_1$–$C_6$-alkyl substituted by halogen, hydroxyl, $C_1$–$C_4$-alkoxy, cyano, $C_1$–$C_3$-alkylcarbonyloxy, hydroxycarbonyl, $C_1$–$C_4$-alkoxycarbonyl, $C_1$–$C_4$-alkoxycarbonyloxy, aminocarbonyl, $C_1$–$C_4$-alkylsulphonylamino, or $C_1$–$C_4$-alkylsulphonyl-$C_1$–$C_4$-alkylamino; $C_2$–$C_7$-alkenyl; or phenyl, cyclopentyl, cyclohexyl, benzyl or β-phenylethyl which are unsubstituted or substituted by $C_1$–$C_6$-alkyl;

$R'_1$ and $R'_2$ when joined together with th N atom, form morpholinyl, piperidinyl, or pyrrolidinyl which is unsubstituted or substituted by one to four $C_1$–$C_4$-alkyls; or R1 is linked to the ring B;

$R'_1$, additionally, when joined to ortho-position of ring B forms indolinyl, tetrahydroquinolinyl, or hexahydrocarbazolyl which are unsubstituted or are substituted by one to four $C_1$–$C_4$-alkyls;

$R_4$ is hydrogen, halogen, $C_1$–$C_6$-alkyl, halo-$C_1$–$C_6$-alkyl, $C_1$–$C_4$-alkoxy, benzyloxy, β-phenylethoxy, $C_1$–$C_6$-alkylbenzyloxy, $C_1$–$C_6$-alkyl-β-phenylethoxy, cyano, phenoxy, naphthyloxy, $C_1$–$C_6$-alkylphenoxy, $C_1$–$C_6$-alkyl-naphthyloxy, halophenoxy, halonaphthyloxy, $C_1$–$C_4$-alkylcarbonylamino, $C_1$–$C_4$-alkylsulphonylamino, phenylcarbonylamino, phenylsulphonylamino, $C_1$–$C_4$-alkylcarbonyloxy or phenylcarbonyloxy, or when joined to B forms naphthalene or tetraline;

$R_5$ is hydrogen, $C_1$–$C_6$-alkyl, $C_1$–$C_4$-alkoxy, or benzyloxy, β-phenylethoxy, $C_1$–$C_6$-alkylbenzyloxy, $C_1$–$C_6$-alkyl-β-phenylethoxy, phenyloxy, $C_1$–$C_6$-alkyl-phenyloxy, $C_1$–$C_6$-alkylnaphthyloxy, naphthyloxy, halophenyloxy, halonaphthyloxy, $C_1$–$C_4$-alkylcarbonylamino, $C_1$–$C_6$-alkylsulphonylamino, phenylcarbonylamino, phenylsulphonylamino, $C_1$–$C_4$-alkylcarbonyloxy, or phenylcarbonyloxy, or when joined to B forms naphthalene or tetraline;

$R_6$ is $C_1$–$C_6$-alkyl, $C_1$–$C_4$-alkoxy, phenoxy, benzyloxy, benzyl, trifluoromethyl, halogen, $C_1$–$C_4$-alkylcarbonylamino, $C_1$–$C_4$-alkylsulphonylamino, phenylcarbonylamino, phenylsulphonylamino, a fused benzene ring, or a fused tetrahydrobenzene ring in the 6, 7-position of A;

n is the number 0, 1, 2 or 3; and $R_7$ is hydrogen, $C_1$–$C_6$-alkyl, $C_1$–$C_4$-alkoxy, cyclopentyl, cyclohexyl, benzyl, β-phenylethyl, $C_1$–$C_6$-alkyl-benzyl, $C_1$–$C_6$-alkyl-β-phenylethyl, phenoxy, naphthyloxy, benzyloxy, $C_1$–$C_6$-alkylphenoxy, $C_1$–$C_6$-naphthyloxy, $C_1$–$C_6$-benzyloxy, halophenoxy, halonaphthyloxy, halobenzyloxy, halogen, $C_1$–$C_4$-alkylcarbonylamino, $C_1$–$C_4$-alkylsulphonylamino, phenylcarbonylamino, or phenylsulphonylamino; or is a fused benzene ring or a fused tetrahydrobenzene ring in the 4,5- or 5,6-position of A.

3. Process of claim 1 wherein the alkylating agent is a dialkyl sulphate.

4. Process of claim 1, wherein the alkylation is initially carried out at 30°–130° C. before being subsequently brought to completion at 30°–80° C. after the addition of water.

5. Process of claim 3, wherein the alkylating agent is dimethyl sulphate.

* * * * *